Sept. 22, 1925.  1,554,905

E. J. BIGNOLD

OPTICAL APPARATUS FOR EDUCATIONAL PURPOSES

Filed Dec. 19, 1924

Inventor
Edward James Bignold
By
B. Singer, Atty.

Patented Sept. 22, 1925.

1,554,905

UNITED STATES PATENT OFFICE.

EDWARD JAMES BIGNOLD, OF SYDNEY, NEW SOUTH WALES, AUSTRALIA.

OPTICAL APPARATUS FOR EDUCATIONAL PURPOSES.

Application filed December 19, 1924. Serial No. 756,979.

*To all whom it may concern:*

Be it known that I, EDWARD JAMES BIGNOLD, a subject of the King of Great Britain, residing at Summer Hill, Sydney, in the State of New South Wales, Commonwealth of Australia, have invented certain new and useful Improvements in Optical Apparatus for Educational Purposes, of which the following is a specification.

This invention relates to improvements in optical apparatus for educational purposes for children or older students, my aim having been to provide inexpensive means whereby a series of objects, more especially those associated with "nature study," may be successively brought into alignment with a magnifying eye piece.

According to my invention, I provide a cylindrical or hollow casing having a rotatable base or table. On the top of the casing is fitted a magnifying eye piece which, if desired, may be adjustably mounted to vary the focal length. The casing is partly cut away or open at one side, to admit light, and within the casing is or are, one or more mirrors whereby the light is reflected onto an object positioned on the base or table adjacent the opening.

Around the rotatable base or table, towards its outer edge or periphery, are fixed circumferentially a series of insects, crystals, or other objects of an educational value. These objects are preferably mounted on slides enclosed by a glass cover, which may be detachable to facilitate substitution of other objects or other slides when desired.

I may provide under the base, a magazine for holding spare slides.

But in order that my invention may be more readily understood, I will now refer to the accompanying drawings, in which Figure 1, is a perspective view of the complete apparatus.

Figure 2, is a section on line 2—2, Figure 1, while

Figure 6, is a perspective view of a tank or reservoir on a rotatable base, wherein marine insects may be observed, while

The same numerals indicate like parts throughout.

Figure 1:
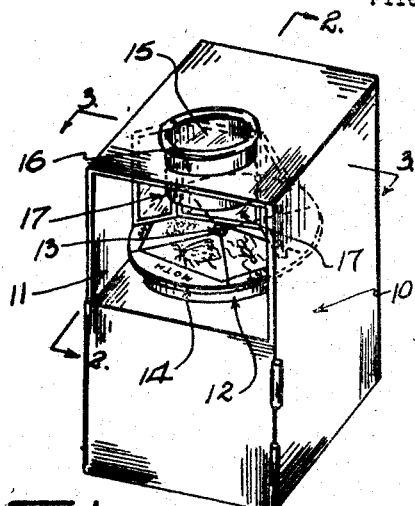
Figure 2:
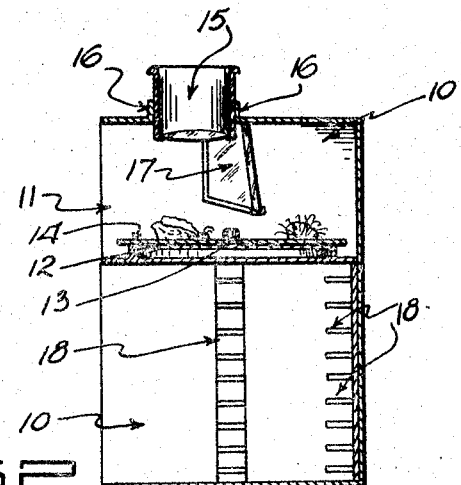
Figure 3:
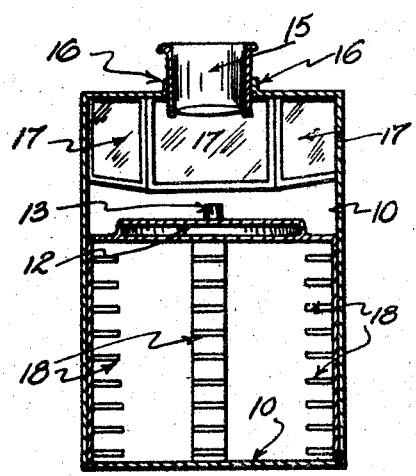
Figure 3, is a similar section on line 3—3, Figure 1.
Figure 4:
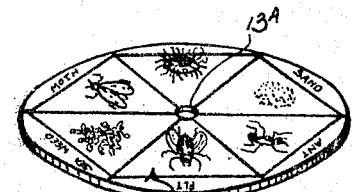
Figure 4, is a perspective view of a rotatable base or disc having a series of natural history or other objects mounted thereon.

10 is a casing, open at one side at 11, and provided with a support 12 and axial post 13, on which a rotatable slide table or base 14 provided with a central hole 13A, may be placed and revolved, to bring a fresh object under the lens 15. This lens 15 is adjustable through the opening or guide 16 in the top of the casing 10, in order to meet the varying requirements of persons of different sights.

17—17 are mirrors or reflectors, so placed that they direct light on all sides of the object being inspected, eliminating any shadows.

18 represent shelves or supports whereon additional slides or the like, may be stored.

Figure 5:
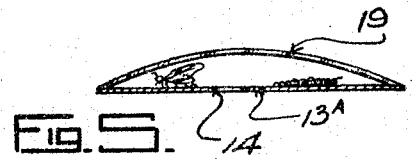
Figure 5, is a cross section of an alternate form of base or disc, which is provided with a glass or transparent cover so that live insects or the like may be observed.

In the modified form of slide or base illustrated in Figure 5, 19 represents a glass or other transparent cover so that live insects may be viewed therethrough.

Figure 6:
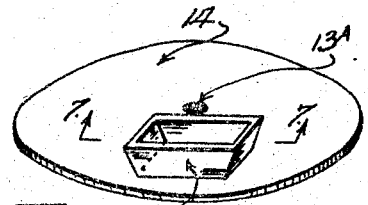
Figure 7:
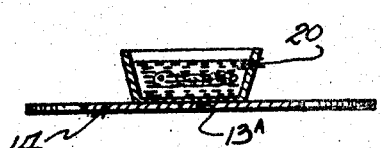
Figure 7, is a cross sectional elevation thereof, on line 7—7, Figure 6.

In Figures 6 and 7, a tank or reservoir 20 is secured to the rotatable disc 14, so that marine insects or the like may be viewed; or I may provide two or more of these tanks on the disc.

I claim:

1. In optical apparatus for educational purposes, a hollow casing open at one side, an opaque disc rotatable centrally on a support and axial post in said casing, an adjustable magnifying eye piece eccentrically mounted in the upper part of said casing, objects carried on said opaque disc, and a series of angularly positioned mirrors opposite the opening in the casing adapted to throw light on the object being viewed through the eye piece.

2. In optical apparatus for educational purposes, a hollow casing open at one side, an opaque disc rotatable centrally on a support and axial post in said casing, an adjustable magnifying eye piece eccentrically mounted in the upper part of said casing, objects mounted circumferentially on said opaque disc, and a series of angularly positioned mirrors opposite the opening in the casing adapted to throw light on the object being viewed through the eye piece.

3. Optical apparatus as claimed in claim 2, including a rotatable slide provided with a transparent cover.

4. Optical apparatus as claimed in claim 2, including a rotatable slide and a container thereon.

In testimony whereof I have hereunto set my hand.

EDWARD JAMES BIGNOLD.